Figure 1:
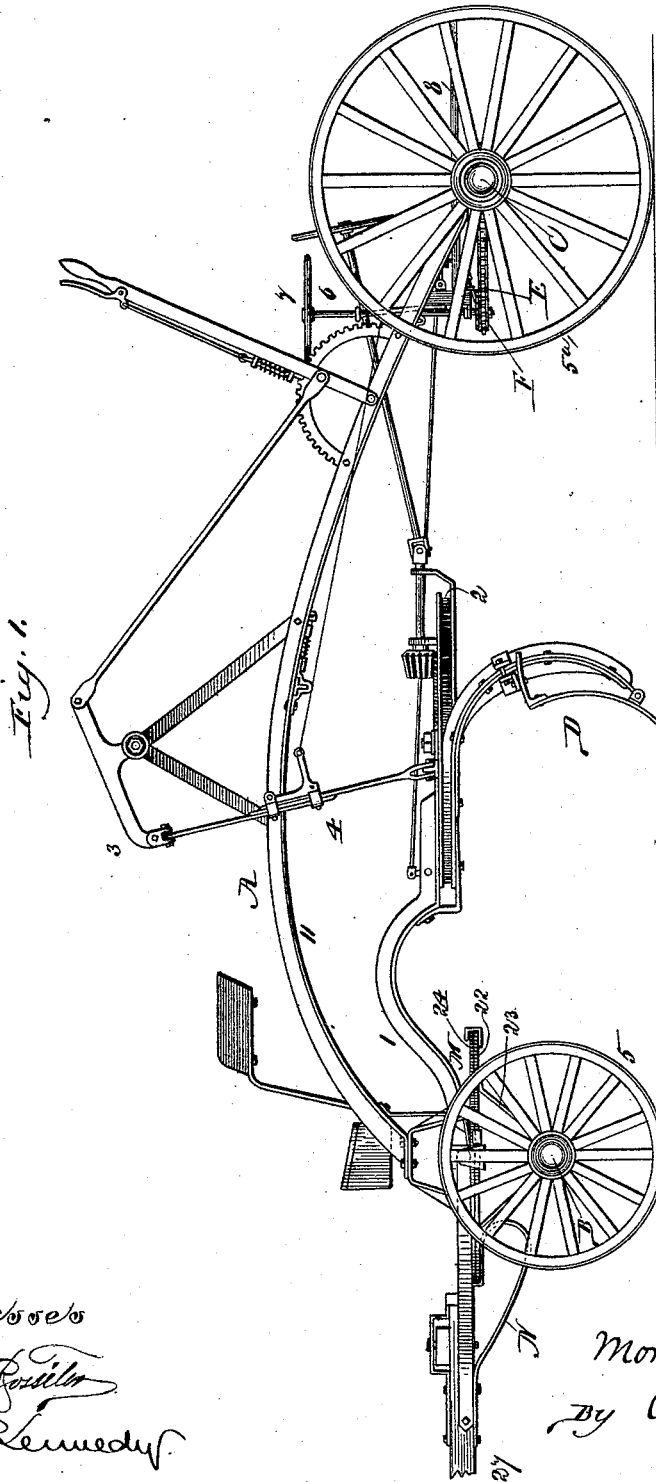

(No Model.) 7 Sheets—Sheet 1.
M. G. BUNNELL.
MACHINE FOR MAKING AND REPAIRING ROADS.
No. 455,701. Patented July 7, 1891.

Witnesses
W. Rozelle
H. C. Kennedy

Inventor
Morton G. Bunnell
By Chas. G. Page
Atty.

(No Model.) 7 Sheets—Sheet 2.
M. G. BUNNELL.
MACHINE FOR MAKING AND REPAIRING ROADS.
No. 455,701. Patented July 7, 1891.

(No Model.) 7 Sheets—Sheet 3.

M. G. BUNNELL.
MACHINE FOR MAKING AND REPAIRING ROADS.

No. 455,701. Patented July 7, 1891.

Witnesses
W. Rossiter
H. C. Kennedy

Inventor
Morton G. Bunnell
By Chas. G. Page
Atty.

(No Model.)  7 Sheets—Sheet 4.
M. G. BUNNELL.
MACHINE FOR MAKING AND REPAIRING ROADS.
No. 455,701.  Patented July 7, 1891.
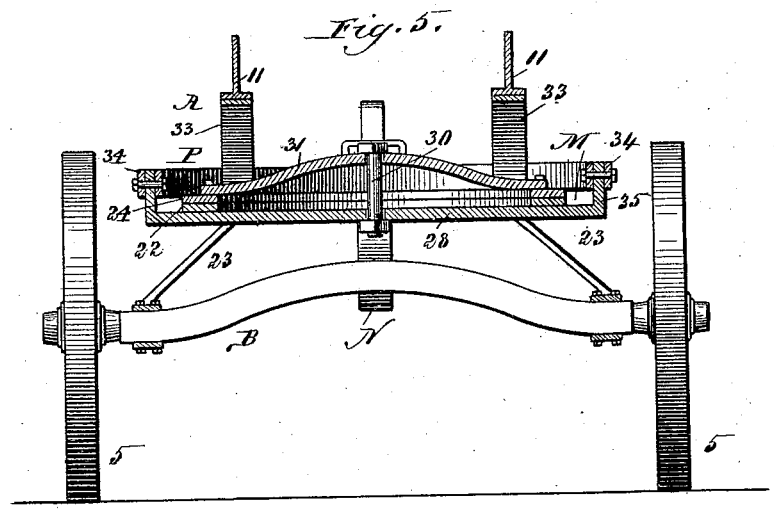
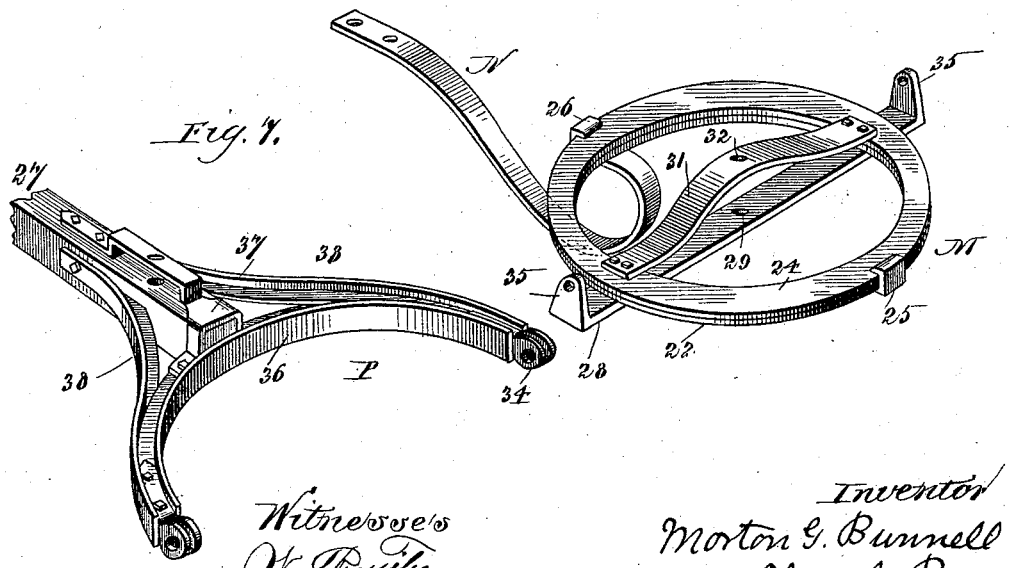
Witnesses
Inventor
Morton G. Bunnell
By Chas. G. Page
Atty.

(No Model.) 7 Sheets—Sheet 5.
M. G. BUNNELL.
MACHINE FOR MAKING AND REPAIRING ROADS.
No. 455,701. Patented July 7, 1891.
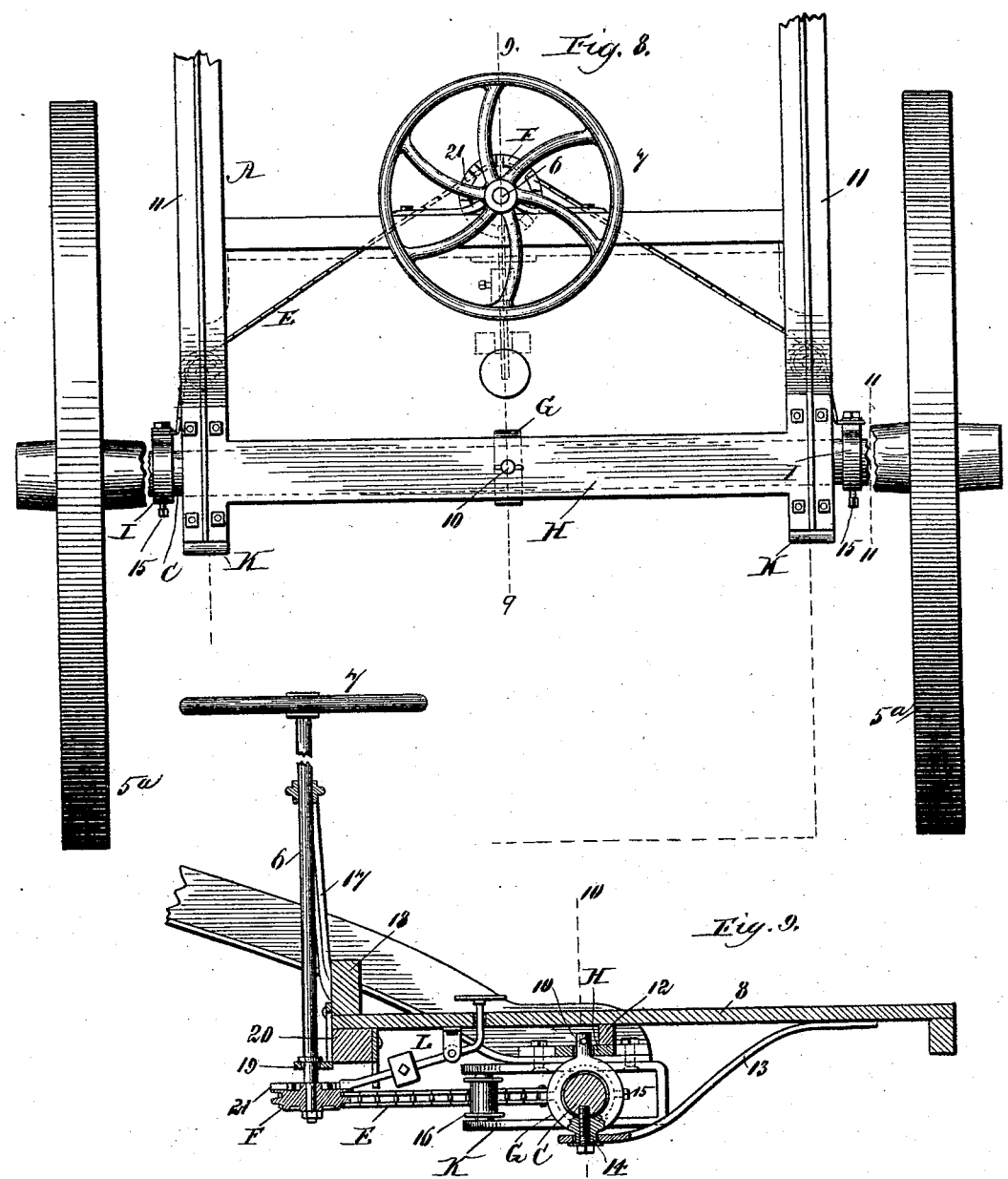
Witnesses
Inventor
Morton G. Bunnell
By Chas. G. Page
Atty.

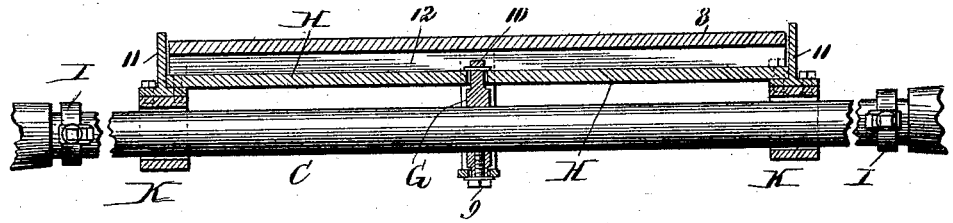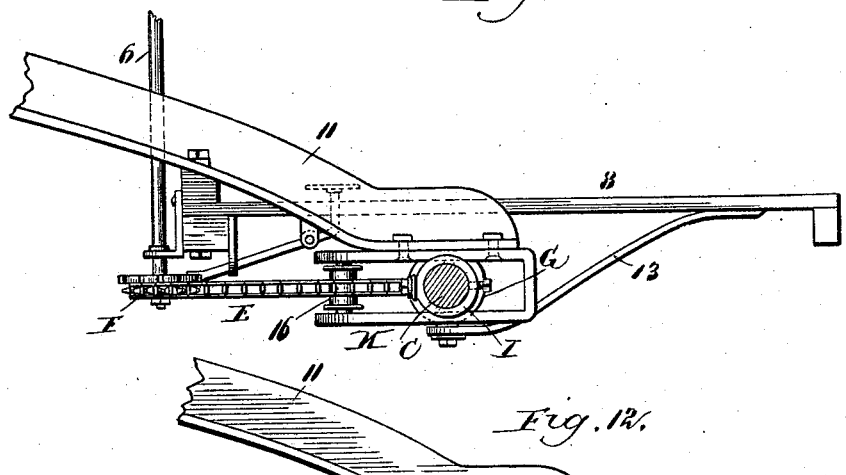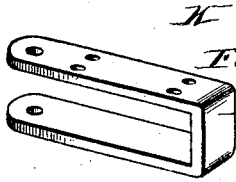

(No Model.) 7 Sheets—Sheet 7.
M. G. BUNNELL.
MACHINE FOR MAKING AND REPAIRING ROADS.

No. 455,701. Patented July 7, 1891.

Witnesses
Inventor
Morton G. Bunnell
By Chas. G. Page
Atty

UNITED STATES PATENT OFFICE.

MORTON G. BUNNELL, OF CHICAGO, ILLINOIS, ASSIGNOR, BY MESNE ASSIGNMENTS, TO ANNA B. AUSTIN, OF SAME PLACE.

MACHINE FOR MAKING AND REPAIRING ROADS.

SPECIFICATION forming part of Letters Patent No. 455,701, dated July 7, 1891.

Application filed August 28, 1890. Serial No. 363,273. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to road-working machines in which a scraper-blade is provided in connection with a wheeled carriage or body frame and arranged so that it can be set oblique to the line of progression, or, as I have hereinafter termed it, arranged for "diagonal work."

The more prominent objects and advantages of a road-machine characterized by my invention are to permit one of the wheels of a long rear axle to be brought into alignment with one of the wheels of a short front axle, so as to permit the machine to run close up to a bank and at the same time provide for quick turning and render the machine steady in its action; to permit the rear wheels to run in selected relation either to a furrow or to a furrow-row; to overcome a disposition on the part of the rear portion of the machine to shift or slip sidewise by reason of side draft induced by the resistance of the soil to the obliquely-arranged scraper-blade; to facilitate the moving of loose earth and obtain a longer delivery by so positioning the body-frame that the blade shall take a furrow-row at its forward end; to provide for a supplemental adjustment of the blade by differently positioning the body-frame; to permit the horses to walk at opposite sides of a furrow-row and at the same time secure the action thereon of the full length of the blade; to provide simple and efficient means for adjusting the rear axle so as to attain the foregoing results, and to provide certain novel and improved matters of construction and combination, all serving to increase the general efficiency of machines for working and repairing roads.

To the attainment of the foregoing and other useful ends my invention consists in matters hereinafter described, and particularly pointed out in the claims.

Figure 2:
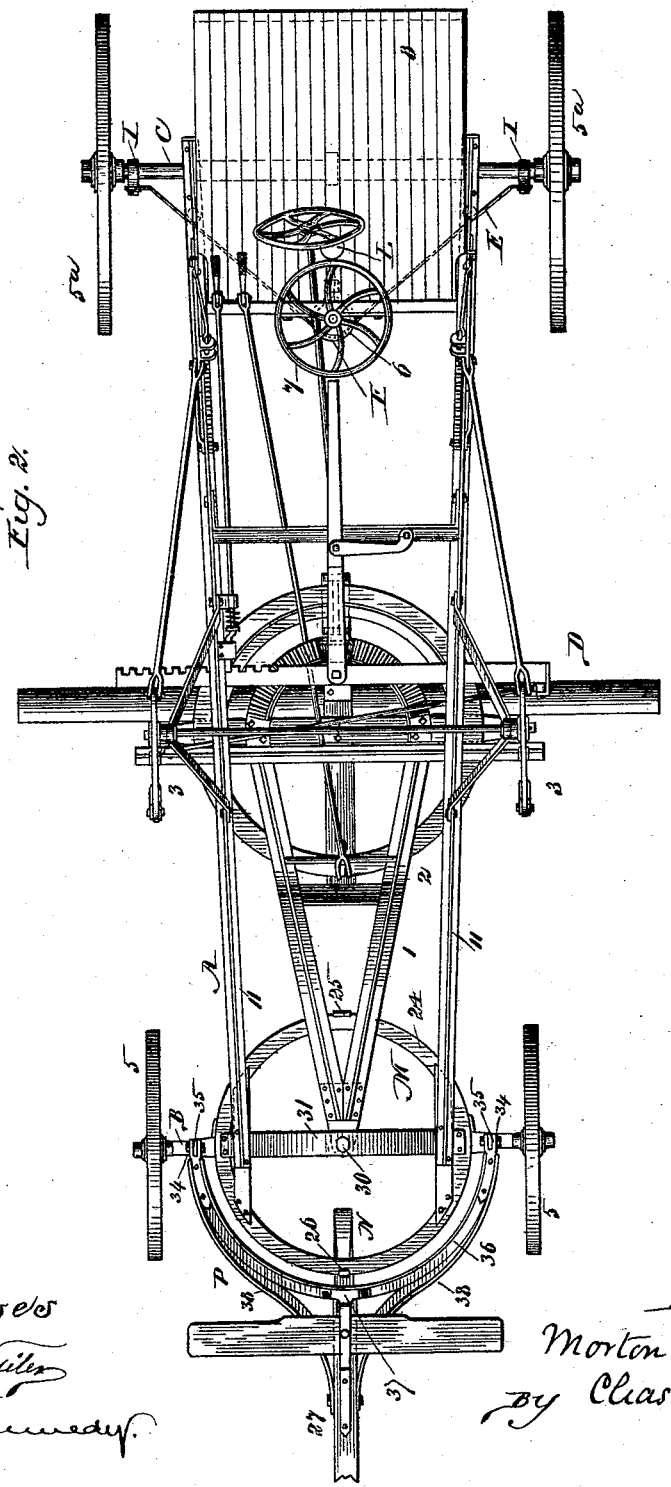
Figure 3:
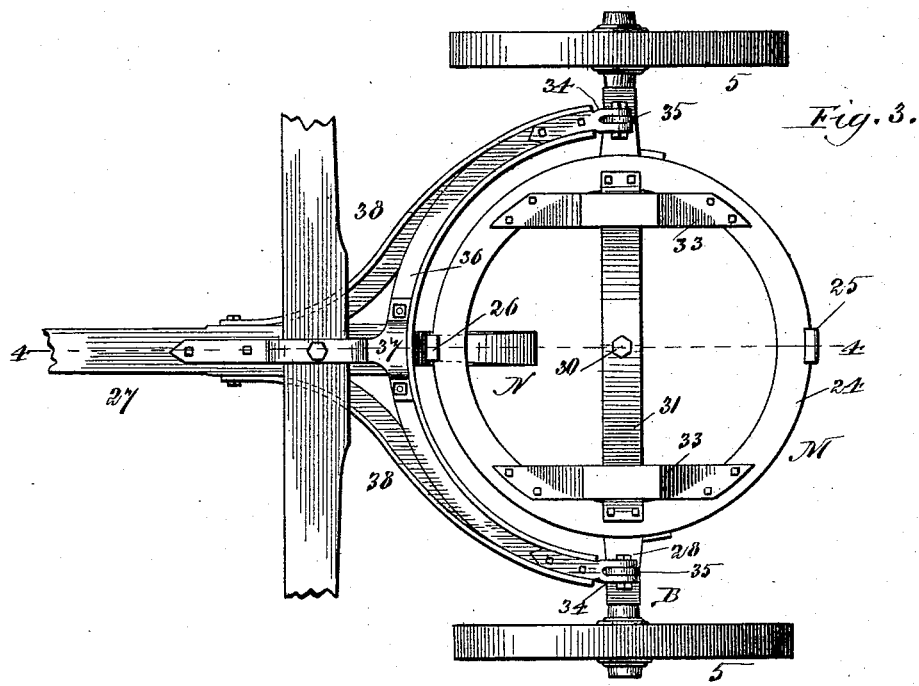
Figure 4:
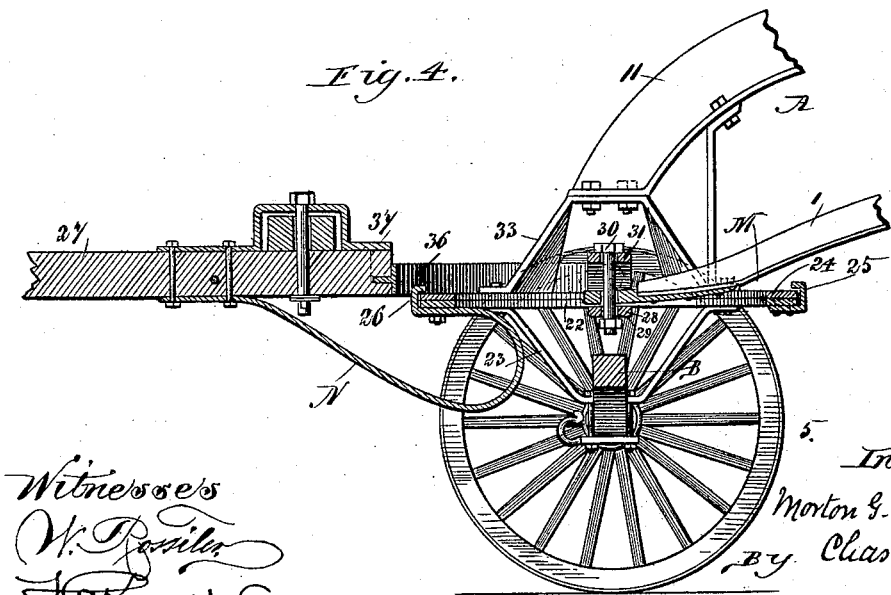
Figure 14:
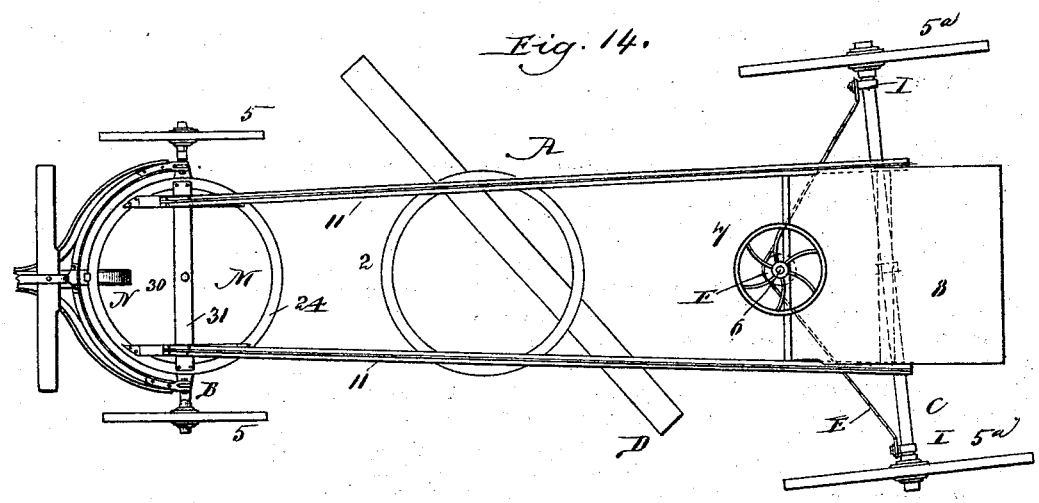
Figure 15:
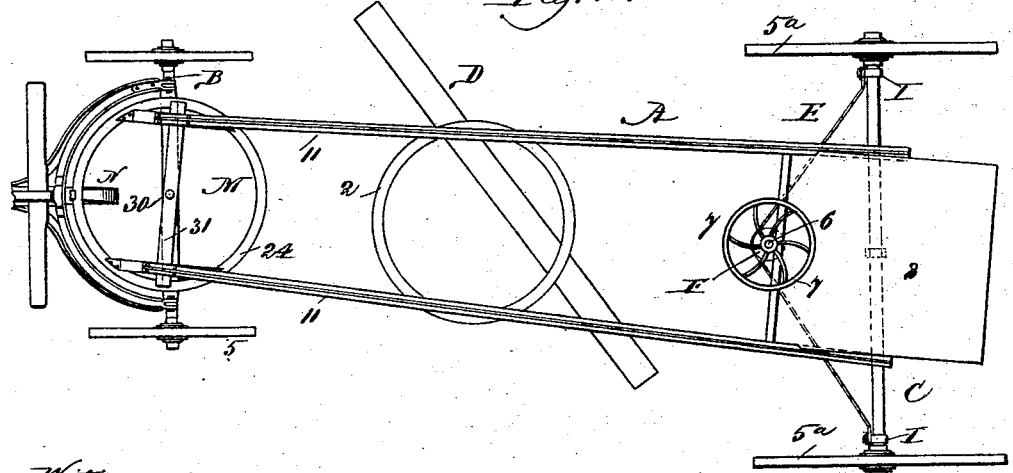

In the accompanying drawings, Figure 1 represents in side elevation a machine for making and repairing roads embodying my invention. Fig. 2 is a top plan view of the same. Fig. 3 is a top plan view of the forward running-gear. Fig. 4 is a section on line 4 4 in Fig. 3, and also represents portions of the draft-bar and body-frame. Fig. 5 represents a section taken transversely and vertically through the fifth-wheel or turn-table, the front axle and its wheels being shown in elevation. Fig. 6 represents said fifth-wheel or turn-table in perspective and includes a spring for upholding the pole. Fig. 7 represents in perspective the rear end of the pole and its yoke or hounds. Fig. 8 is a top plan view of the rear portion of the machine with the rear platform removed and the axle broken away at points between the body-frame and rear wheels for convenience of illustration. Fig. 9 is a section on line 9 9 in Fig. 8, the hand-wheel shaft and hand-wheel being in elevation, with the shaft broken away for convenience of illustration. In this view the rear platform is shown. Fig. 10 is a section on line 10 10 in Fig. 9, with the axle broken away at certain points and shown in elevation. Fig. 11 is a section on line 11 11 in Fig. 8 with the rear platform applied. Fig. 12 is a detail showing in side elevation the rear end portion of one of the sides of the body-frame and a combined guide and roll-bearing secured thereto. Fig. 13 represents said combined guide and roll bearing in perspective. Fig. 14 is more in the nature of a diagram, illustrating in top plan view the machine with the adjustable swinging long rear axle swung round. Fig. 15 is a like view illustrating the position the rear wheels, rear axle, and body-frame of Fig. 14 will take by reason of the advancement of the machine.

The body-frame A of the machine is pivotally supported upon both the front axle B and the rear axle C. The scraper-blade D extends across the space between the front and rear wheels and is supported from the body-frame through the medium of raising and lowering devices, which can be of any suitable construction. The blade is also reversible—that is to say, it is pivotally held between its ends—so that it can be swung horizontally either way, and thus permit either of its ends to be placed ahead, it being understood that when in working position it is diagonal with relation to the line of progression of the machine and that it is diagonally adjustable with reference to the line of progression of the machine.

As a means for drawing the blade and for attaining various desirable adjustments thereof—such as raising and lowering it bodily, raising and lowering it at either end, turning it so as to throw either end forward or vary its horizontal angle relatively to the line of progression, and swinging it toward either side of the machine—I have herein shown substantially the devices embodied in certain Letters Patent of the United States heretofore granted to F. C. Austin as my assignee, to wit: Nos. 427,738, 427,739, and 427,740. With reference, however, to my present invention I do not confine myself to these special devices, and may substitute therefor any other devices suitable for effecting the several desirable adjustments of the scraper-blade. I may, however, herein briefly note that in said drawings the blade is drawn by a draft-bar 1 and carried by a circle 2, having a pivotal connection with the draft-bar and suspended from raising and lowering levers 3 by hangers 4.

The rear axle is made longer than the front axle, and hence I will hereinafter refer to these said axles as the "long rear axle" and the "short front axle." The body-frame is at its forward end pivotally supported upon the short front axle, as aforesaid, and is at its rear end pivoted upon the rear axle at a point between the ends of the latter. By pivoting the body-frame upon the front wheeled axle the latter may of course swing in turning the machine; but in addition to this function the pivotal connection between the body-frame and the front axle permits the body-frame to swing horizontally and independently of the front axle while the latter is at right angles to the line of draft and its wheels 5 are running straight ahead. In connection with the rear axle and the body-frame I provide means whereby an operator standing upon the machine may swing said rear axle horizontally about its pivotal connection and in either direction. The rear axle is therefore capable of a swinging adjustment, as illustrated in Fig. 14, in which the long rear axle is swung about its pivot so as to place it oblique to the line of progression and at an angle to the forward axle, it being also noted that in said figure the body-frame is in line with the direct line of progression, while the rear axle lies oblique or diagonal to said line. Assuming the long rear axle to have been thus adjusted and the team employed for drawing the machine to have been started up, the tendency of the rear wheels 5$^a$ to crowd or run to one side will cause the body-frame to swing horizontally upon the short front axle, so as to bring it substantially into the position shown in Fig. 15, wherein it lies oblique to the line of progression. The act of thus bringing the body-frame into an oblique position restores parallelism between the front and rear axles, as illustrated in said figure. Under such conditions, therefore, all of the wheels are in planes parallel with the line of progression, and hence run straight ahead. An important advantage involved in the foregoing is that by thus adjusting the long rear axle one of its wheels can be brought into alignment with one of the wheels of a short front axle, as in said Fig. 15, wherein the wheels at one side of the machine are shown in such alignment. The two wheels thus brought into alignment may therefore be run close up to a bank either to permit cutting into the same or for the purpose of bracing the wheels against side draft in case such should be necessary, and also that while one rear wheel at one side of the machine can be thus brought into alignment with the forward wheel at said side the remaining rear wheel at the opposite side of the machine can be projected considerably beyond the track of the front wheel at such side, and hence be caused to run in selected relation to a furrow. In practice, however, I find that this adjustment of the rear axle overcomes side draft—that is to say, overcomes any tendency of the rear portion of the machine to swing around by means of the resistance of the soil to the diagonally-arranged blade. Thus a disposition on the part of the body-frame to swing from its position in Fig. 15 to its position in Fig. 14 will necessarily tend to change the wheels from their position in Fig. 15 to their position in Fig. 14. Such tendency on the part of the body-frame to thus shift the wheels will, however, be met and resisted by the wheels, which, when turned, however slightly, toward their position in Fig. 14, will manifestly endeavor to run in a direction to again bring them into proper alignment with the line of progression, and since this tendency on the part of the rear wheels to run, as in Fig. 15, is constant there will be a constant resistance to the swinging round of the rear end portion of the machine.

The feature of bringing the wheels of the long rear axle and short front axle into alignment at one side of the machine is an important one, since, first, it permits the employment of a short front axle, whereby the machine can be turned quickly and within the limited space of the road-bed; second, it permits the employment of a long rear axle, which gives steadiness to the machine and not only avoids tipping during hillside work, but also allows the rear wheels to be run, respectively, at opposite sides of a gutter alongside the road, under which circumstances one wheel may be upon a bank or elevated piece of ground. To the foregoing I may also add that the long rear axle permits its wheels to run in selected relation to a furrow-row left by the blade. A further important feature involved in the foregoing is that the adjustment of the rear axle causes an adjustment on the part of the body-frame, and that by such adjustment I obtain a set of the part of the blade, which permits the effective utilization of the entire length of the blade by permitting a longer delivery, and thereby rendering it more serviceable as a means for moving earth. It also permits the adjustment of the blade, so that while placing its forward end in effective working position and allowing its rear end to deposit a furrow-row clear of the rear wheels it allows the horses to walk at opposite sides of the previously-formed furrow-row, which will be straddled by the wheels of the short front axle.

The rear axle can be swung either way and the blade reversed accordingly, it being understood that the rear axle can be adjusted reversely to its adjustment shown in Fig. 14, and that the blade can be turned so as to throw forward its end which occupies the rear position in said figure, in which case the conditions of the machine will be the reverse of that indicated in Fig. 15.

While I may, in conjunction with the body-frame pivotally held upon a short front axle and long rear axle, provide various means whereby an attendant standing upon the machine may swing the rear axle either preparatory to or during the operation of the machine, I have herein shown as a simple, convenient, and effective device a chain E, attached at its ends to the rear axle adjacent to the ends thereof and carried about a sprocket F on a hand-wheel shaft 6. This hand-wheel shaft is carried by the body-frame of the machine and is arranged so that the elevated hand-wheel 7 thereon shall be within convenient reach of an attendant standing upon the rear platform 8 of the machine. (Partially shown in dotted lines in Fig. 8.) By attaching the chain to the axle at points near the wheels sufficient leverage is obtained to permit the operator to readily adjust the axle to any desired horizontal angle relative to the line of progression of the machine and to make such adjustment at any desired moment. While it is generally preferable to so adjust the long rear axle that the wheels at one side of the machine shall be brought into alignment in order that the one of said rear wheels shall run in the track of the wheel directly ahead of it, it is also at times desirable to adjust the rear axle so as to permit the rear wheels to run in other selected lines with reference to the road-bed, and also to position the body-frame with reference to the desired general position of the blade.

The foregoing can be readily attained, since the rear axle can be swung round more or less, as may be found necessary. With reference to certain details constituting matters of further improvement, G indicates a collar, which is fitted upon the rear axle at a point midway of the ends thereof and secured thereto in any suitable way—as, for example, by a bolt 9. This collar G is provided with a vertical pivot 10, which is employed for pivotally connecting the rear axle with the body-frame. To provide a bearing for the pivot 10 thus fixed upon and arranged to rise from the rear axle, I secure upon the rear end portions of the side bars 11 of the body-frame a cross-bar H, as best shown in Fig. 10, wherein the pivot 10 has its bearing in said bar. The cross-bar H is arranged below the rear platform 8, and as a convenient support for the rear platform along a line over the cross-bar H a bar 12 is arranged between the two. While the bolt 9 serves as a means for fixing the collar upon the rear axle, said collar is further held and its upturned pivot steadied by a brace 13, secured at its forward end to the body-frame (as, for example, to the rear platform, as in Fig. 9) and at its rear end provided with a bearing for a neck or pivot 14 on the under side of the collar, it being observed that said neck or pivot can be adapted to provide a portion of the bearing for the bolt 9.

The ends of the chain E are attached to collars I, which are adjustably held upon the rear axle, a simple way of adjustably holding said collars upon the axle being by bolts or set-screws 15, Fig. 8, although of course they can be clipped or clamped upon the axle in any other suitable way. By such arrangement the collars can be adjusted on the axle so as take up any slack in the chain.

The body-frame is provided with a couple of bearings K for rolls 16, which serve as guides for the adjusting-chain E. These bearings are bolted to the sides of the body-frame and are arranged adjacent to the points whereat the ends of the chain are connected with the rear axle, and are also arranged so as to position the rolls somewhat ahead of said points, as indicated in dotted lines in Fig. 8, by which arrangement the operation of the chain will cause it to exert a pull upon one or the other end of the axle in a direction to permit the same to be swung with ease. The bearings K are, as a matter of further improvement, made substantially U-shaped, so that they may embrace the axle, and thereby form guides for it when it is swung round.

The hand-wheel shaft 6 is conveniently supported and steadied by a bearing 17, arranged to rise from a cross-bar 18 upon the rear platform, and a bracket-bearing 19, secured to a cross-bar 20 on the under side of said platform.

The chain-sprocket F is provided with a circular rack or upper toothed portion 21, which can be engaged by a latch L, herein employed for locking the hand-wheel shaft and its sprocket against rotation. The latch L, which can be weighted or spring-controlled, is pivotally attached to the rear platform or other suitable fixture on the body-frame and extends above the rear platform, so that an operator standing upon the rear platform in position to operate the hand-wheel can also control the latch, and hence unlock the sprocket when it is desired to adjust the rear axle.

As a means for pivotally supporting the forward end of the body-frame upon the front axle, I provide as a connection between the two a fifth-wheel or turn-table M, constructed as follows, to wit: A ring-plate 22 is arranged over and secured upon the front axle by braces 23, having forwardly and rearwardly extending upturned arms, which are secured to the under side of the ring-plate, said braces being at points between their upturned arms secured upon the axle adjacent to the wheels thereof. Upon the ring-plate 22 is an upper ring-plate 24, which is arranged to turn upon said lower ring-plate 22, being conveniently held thereon by a bent lip 25, which is secured to the lower ring-plate, and by a lip 26, formed by the bent rear end of a spring-bar N, which is at its forward end secured to the tongue or pole 27, it being here observed that the main function of said spring-bar is to hold up the pole, and thus relieve the necks of the horses from the weight of the same, and to such end said spring-bar is bent to form a suitable spring and secured to the lower ring-plate or circle 22, as in Fig. 4. The lower ring-plate seats upon a cross-bar 28, which is provided with a hole 29, Fig. 6, for the king-bolt 30, and the upper ring-plate or circle 24 is provided with a cross-bar 31, which is secured thereto and also provided with a hole 32 for the ring-bolt. Said cross-bar 31 is secured at its ends to the upper circle and is bent upwardly along its middle portion, so as to provide space for the forward end of the draft-bar 1, which is pivotally held by the king-bolt, as in Fig. 4. A couple of oppositely-arranged raised seats 33 are secured upon the upper circle, and the forward ends of the side bars of the body-frame are secured upon said seats, thereby rigidly securing the body-frame upon the upper circle. The lower ring-plate or circle 22 is understood to be rigid with the lower cross-bar 28, to which latter the pole is hinged by hounds herein formed by a yoke P, having eyes 34, which are pivoted to upturned ends 35 of the cross-bar 28. This yoke comprises a half-circular portion 36, which is attached to the rear end of the pole by a socket-plate 37 and braced by the side braces 38. The foregoing mode of pivotally attaching the body-frame to the front axle permits the free turning of one of said members independently of the other, and at the same time prevents rocking of the body-frame, it being noted that in order to hold the blade down to its work it is desirable to prevent rocking on the part of the body-frame.

With further reference to the rear axle it will be obvious that I provide extremely simple and efficient means for pivoting it directly to the body-frame, and that by making it longer than the width of the body-frame I obtain sufficient room for swinging the rear wheels without altering the general width of the body-frame, which in a modern road-making machine is for the sake of strength, simplicity, and general convenience with reference to the blade-operating devices formed with two long metal side bars arranged to extend from front to rear of the machine, although of course the frame could, if desired, be made of wood—a material, however, not particularly favored by operators of the road-making machines. The extended rear axle also permits the chain to be attached thereto at points somewhat remote from the middle point whereat said axle is pivotally connected with the body-frame, and in this way sufficient leverage is obtained to permit the operator to swing the axle with ease during the operation of the machine. The short front axle permits the blade, when so desired, to be projected beyond its track, and also permits the rear wheels to be alternately placed in alignment with corresponding front wheels, so that when one rear wheel is in alignment with the wheel ahead of it the other rear wheel will be considerably beyond or outside of the track of what may be termed its "companion front wheel."

What I claim as my invention is—

1. The combination, substantially as hereinbefore set forth, in a machine for making and repairing roads, of a suitable body-frame pivotally supported at its forward end upon a front axle and at its rear end pivotally supported by an adjustable swinging rear axle, a hand-wheel shaft provided with a sprocket, a chain passing about said sprocket and attached to the rear axle at opposite sides of the point whereat said axle is pivotally connected with the body-frame, and a diagonally-adjustable scraper-blade supported below the body-frame and arranged to extend across the space between the front and rear wheels.

2. The combination, substantially as hereinbefore set forth, in a machine for making and repairing roads, of a suitable body-frame pivotally supported at its forward end upon a short front axle and at its rear end pivotally supported by an adjustable swinging long rear axle, a sprocket and operating-shaft carried by the body-frame, a chain passing about said sprocket and attached to the long rear axle at opposite sides of the point whereat said axle is pivotally connected with the body-frame, and a reversible scraper-blade arranged below and extending across the body-frame.

3. The combination, in a road-making and road-repairing machine provided with a body-frame which is pivotally supported at its forward end upon a front axle and a diagonally-adjustable scraper-blade supported below the body-frame and arranged to extend across the space between the front and rear wheels, of an adjustable swinging rear axle provided at a point between its ends with a collar which is secured upon the axle midway of the ends thereof and provided with a pivot by which it is pivotally connected with the body-frame, substantially as set forth.

4. The combination, in a road-making and road-repairing machine provided with a body-frame which is pivotally supported upon the front axle and a diagonally-adjustable scraper-blade arranged to extend across the space between the front and rear wheels, of an adjustable swinging rear axle, a collar G, secured upon the rear axle midway of its ends and provided with an upwardly-extending pivot 10, and a downwardly-extending pivot 14, the body-frame being provided with bearings wherein said two pivots are journaled, for the purpose set forth.

5. The combination, substantially as hereinbefore set forth, in a road-making and road-repairing machine provided with a diagonally-adjustable scraper-blade arranged to extend across the space between the front and rear wheels and a body-frame which is pivotally supported upon a short front wheeled axle, of a cross-bar H, secured to side bars 11 of the body-frame, and an adjustable swinging long rear axle pivoted between its ends to the cross-bar, said cross-bar forming a bearing for the rear axle-pivot.

6. The combination, substantially as hereinbefore set forth, in a road-making and road-repairing machine provided with a diagonally-adjustable scraper-blade arranged to extend across the space between the front and rear wheels and a body-frame which is pivotally supported upon a front wheeled axle, of an adjustable swinging rear axle pivotally connected between its ends with the body-frame, collars I, adjustably held upon said rear axle, a chain attached at its ends to said collars, and means suitable for operating said chain.

7. The combination, substantially as hereinbefore set forth, in a machine for making and repairing roads, of a diagonally-adjustable scraper-blade arranged to extend across the space between the front and rear wheels, the body-frame comprising side bars 11 and pivotally supported upon an adjustable swinging wheeled rear axle, and a fifth-wheel arranged over the front axle and comprising a lower circle, which is secured upon the front axle, and an upper circle, with which the forward ends of the side bars are rigidly connected.

8. The combination, substantially as hereinbefore set forth, in a machine for making and repairing roads, of a body-frame pivotally supported upon an adjustable swinging wheeled rear axle, a diagonally-adjustable scraper-blade arranged to extend across the space between the front and rear wheels, a lower circle secured upon the front wheeled axle, an upper circle supported upon the lower circle and supporting the forward end of the body-frame, the king-bolt by which the two circles are pivotally connected together, and a spring-bar N, secured both to the pole and to the lower circle.

9. The combination, substantially as hereinbefore set forth, in a machine for making and repairing roads, of the body-frame pivotally supported by an adjustable swinging rear wheeled axle, a diagonally-adjustable scraper-blade arranged to extend across the space between the front and rear wheels, a lower circle 22, supported upon the front wheeled axle, an upper circle 24, supporting the forward end of the body-frame, a cross-bar 28, rigid with the lower circle, and the pole provided with hounds, which are hinged to said cross-bar.

10. The combination, substantially as hereinbefore set forth, with the body-frame and a diagonally-adjustable scraper-blade arranged to extend across the space between the front and rear wheels, of the lower circle 22, supported upon the wheeled front axle, the upper circle 24, arranged to turn upon the lower circle, cross-bars 28 and 31, secured, respectively, to the upper and lower circles, a king-bolt extending through said cross-bars, and the draft-bar for drawing the scraper-blade, having its forward end pivotally held between said cross-bars by the king-bolt.

MORTON G. BUNNELL.

Witnesses:
C. F. HINMAN,
HARRY COBB KENNEDY.